Nov. 20, 1934.  S. VERNET  1,981,011
AUTOMOBILE HEATER
Filed Oct. 4, 1930
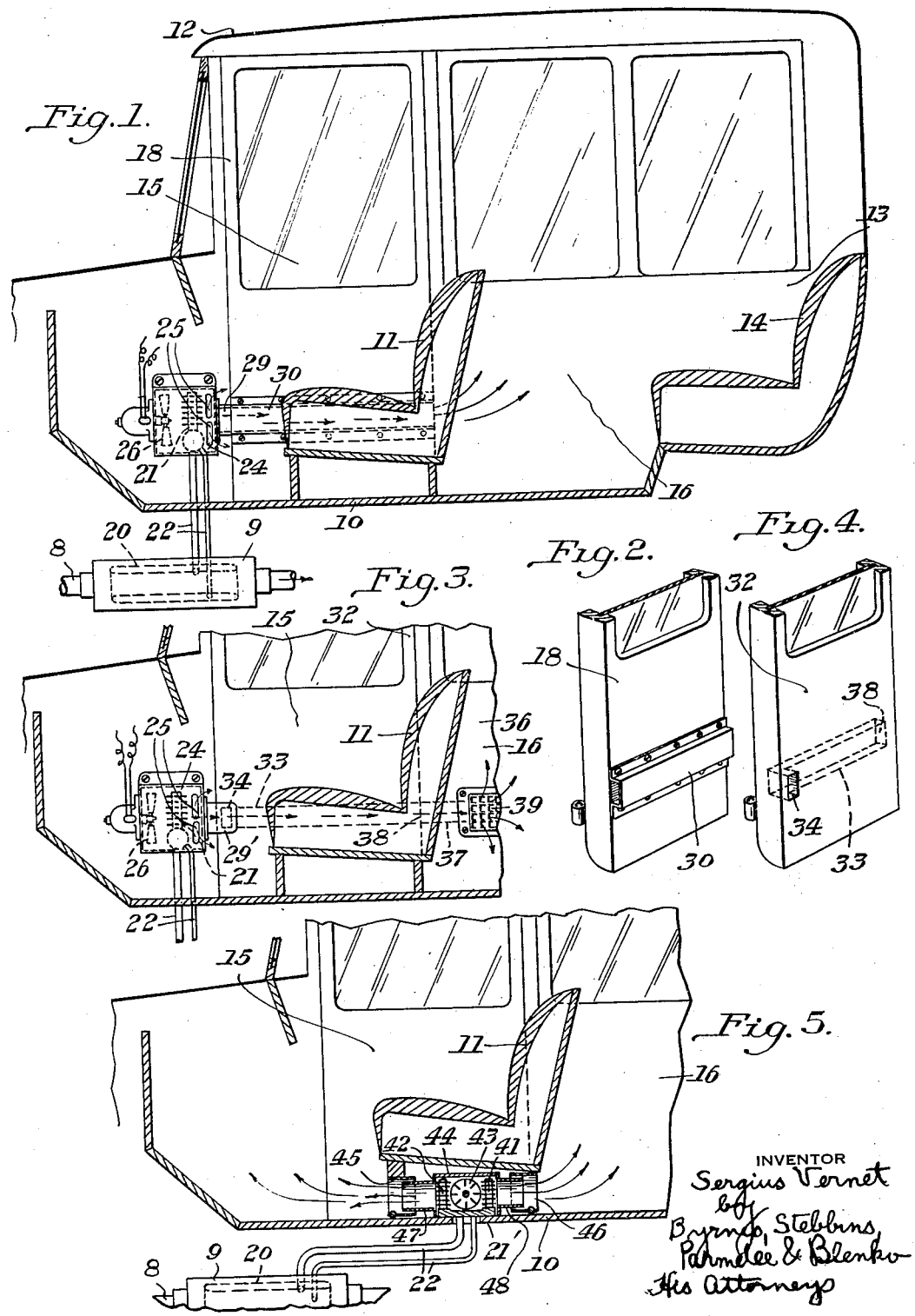
INVENTOR
Sergius Vernet
by Bruno, Stebbins,
Parmelee & Blenko
His Attorneys Patented Nov. 20, 1934

1,981,011

UNITED STATES PATENT OFFICE 1,981,011

AUTOMOBILE HEATER

Sergius Vernet, Brooklyn, N. Y., assignor to Foster-Vernay Corporation, Pittsburgh, Pa., a corporation of New York Application October 4, 1930, Serial No. 486,379

4 Claims. (Cl. 237—12.3)

This invention relates to an improvement in heating systems for automobiles and other automotive vehicles, and particularly to an arrangement for heating both the front and rear compartments of a vehicle provided with seating means separating the interior of the vehicle into two or more compartments.

One object of my invention is to provide a heating system which may be used as the heating equipment for a vehicle having front and rear compartments, the heating system being arranged, when installed, to heat both compartments. A further object of my invention is to provide a heating system which may be used in a vehicle having a front compartment and a rear compartment separated by seating means to deliver heated air to the two compartments, the system including a conduit extending between the two compartments.

In the drawing there is disclosed for purposes of illustration and not as limiting my invention, two embodiments, and a modification of one of the same, which my invention may assume. In the drawing, Fig. 1 is a central vertical sectional view, partly diagrammatic, through an automotive vehicle equipped with a heating system embodying the principles of my invention;

Fig. 2 is a detailed perspective view showing a portion of the door of the vehicle equipped with a conduit forming a part of the heating system;

Fig. 3 is a fragmentary view similar to Fig. 1 illustrating a modification of this embodiment of my invention;

Fig. 4 is a detailed perspective view corresponding to Fig. 2, but illustrating a door as used in the modification shown in Fig. 3;

Fig. 5 is a view similar to Fig. 1 showing another embodiment of my invention.

In equipping vehicles with a heating system according to my invention, any suitable form of heating device for supplying heated air may be employed. For purposes of illustration, I have shown the type of heating unit disclosed in my copending application, Serial No. 415,712, filed December 21, 1929.

It may be convenient to install the heating unit in various portions of the vehicle, since the arrangement of the exhaust pipe, or the construction of the vehicle body may make it desirable or necessary to place the heater in some particular location. In the drawing I have illustrated two locations; but I do not desire to limit my invention to these particular locations. It is desirable, however, for reasons of simplicity, and because of the cost of the heating units, to use but a single unit for heating the entire vehicle. Where, as in the vehicle illustrated in the drawing, the vehicle is divided into two or more compartments by seating means, the effect of the heating unit is localized, if the same be disposed in one or another of the compartments. In accordance with my invention, I provide conduit means arranged to cooperate with a heating unit, so that the heating unit may deliver heated air to both compartments. Should the heating unit be arranged outside of the compartments, the system may be so arranged that the heating unit supplies heated air to the conduit, and the latter is provided with a plurality of outlets, one for each compartment. If the heating unit be closely adjacent one compartment, the portion of the conduit extending to that compartment would be very short, and the major portion of the conduit would extend to the other compartment or compartments. It may be convenient to so arrange the system that the portion of the conduit extending to one of the compartments is practically negligible, and substantially all of the conduit extends between the heater and the other compartment. Such a case is illustrated in Figs. 1 and 3; as in the structure shown therein, no substantial portion of the conduit is necessary for delivering heated air to the front compartment.

In the embodiment disclosed in Fig. 1, the automotive vehicle comprises a motor (not shown), from which the exhaust gases are conducted rearwardly through a pipe 8 communicating with a muffler 9. The muffler is disposed beneath floor boards 10 of the vehicle, somewhat forward of the front seating means 11. In the embodiments disclosed, the vehicle is of the two-door type, having a roof 12, a body portion 13, and a rear seating means 14. The front seating means 11 divides the interior of the vehicles into a front compartment 15 and a rear compartment 16. The vehicle is furthermore provided with a pair of front doors 18, the right-hand door being shown in Fig. 1.

Within the muffler 9 is arranged a vapor generator 20, which communicates with a radiating unit 21, arranged in front of the seating means 11 and adjacent the right side of the vehicle. Piping 22 connects the vapor generator 20 with the heating unit 21. The heating unit is arranged within a casing 24 formed with perforations 25 in its rear portion, so that a fan 26 may blow heated air through the perforations into the front compartment 15. A short section 29 of conduit is arranged against the right side of the vehicle in communication with the interior of the casing 24. A section of conduit 30 is attached to the door 18 so as to register with the conduit section 29 when the door is in closed position. In certain types of automotive vehicles now on the market, the front seating means 11 may comprise a movable portion to admit passengers to the rear compartment 16. Very commonly, such vehicles are constructed so that there is a space left between the movable portion and the door 18. This provides room for the conduit section 30 when the door is closed. As will be noted in Fig. 1, the rear end of the conduit section 30 extends closely adjacent the rear of the movable portion of the seating means 11; and accordingly the fan 26, when operated, forces heated air out of the casing 24 both to the front compartment 15 and to the rear compartment 16.

In Fig. 3 there is illustrated a modification of this embodiment of my invention which is designed to take care of a vehicle structure which does not afford space between the front seating means 11 and the door, which is indicated by the numeral 32. Accordingly, I have formed the door 32 with a conduit 33 extending rearwardly within the structure of the door itself. The conduit section 29' is angularly arranged, so that when the door 32 is closed, the inlet 34 of the conduit 32 registers with the conduit section 29'. As is clearly apparent from Fig. 3, the conduit section 29' is somewhat longer than the conduit section 29 of Fig. 1. The body 36 of the vehicle is formed with a conduit section 37 which has an inlet arranged to register with the outlet 38 of the conduit 33 in the door 32 when the latter is in closed position. The conduit 37 is adapted to discharge heated air through a grating 39 into the rear compartment 16. This modification has the advantage that it is applicable to a great variety of vehicle structures, but has the disadvantage that it would be costly and somewhat inconvenient to apply to vehicles already manufactured.

In Fig. 5 there is illustrated another embodiment of my invention which may be so installed in the vehicle body that the heating unit is disposed in neither compartment. In the form illustrated, the heating unit 21' is formed with two branches, 41 and 42, with a centrifugal blower 43 interposed between the two. The unit 21', together with the blower 43, are enclosed within a casing 44 having extensible conduits for directing heated air partly to the forward compartment 15 and partly to the rear compartment 16. Of the conduit for directing heated air to the forward compartment, one section 45 is carried by the seating means 11, and the other section 47 is carried by the casing 44, the two sections 45 and 47 overlapping or telescoping. Similarly, of the conduit for directing heated air to the rear compartment, one section 46 is carried by the seating means 11, and the other section 48 is carried by the casing 44, the two sections 46 and 48 overlapping or telescoping.

In this embodiment, the heating unit 21' and the conduit are disposed beneath the front seating means 11. This seating means 11 is adjustable forwardly or rearwardly in a well known manner, and the two conduits, the one directing air forwardly, and the other rearwardly permit such adjustment due to their telescopic construction. The heat absorbed from the exhaust gases of the motor is radiated from the heating unit 21', and the blower 43 causes hot air to flow through the conduits to the two compartments 15 and 16. According to this embodiment of my invention, the heating unit is disposed above the floor boards 10, but in a location where it will not interfere in any way with the use of the passenger space of the vehicle. The entire heating system is very compact, and the length of the conduit is less than in the other embodiments.

It will be apparent that by my improved heating system, I have facilitated the convenient heating of all parts of a passenger vehicle by but a single heating unit. It will, furthermore, be apparent that the means for conducting the hot air from the unit to the various parts of the vehicle are not in such position as to interfere with the use of the space used by the occupants. In this improved arrangement for heating vehicles, when the system is installed in accordance with my invention, none of the mechanism projects into space which is ordinarily used by the passengers either in entering the vehicle, leaving the same, or while seated within the same.

While I have disclosed two embodiments of my invention and a modification of one of these embodiments, it is to be understood that my invention is not so limited, and that various changes may be made in the size, shape and relation between the parts, and numerous substitutions may be made without departing from the scope of my invention, as defined in the following claims.

I claim:

1. In combination with a vehicle having a front compartment for passengers, a rear compartment for passengers, seating means separating the two compartments, and a door for ingress and egress to and from one of the compartments, a heating system comprising a source of heated air and a conduit movable with the door for conducting heated air from the source to a compartment.

2. In combination with a vehicle having a front compartment, a rear compartment, seating means between the front compartment and the rear compartment, and a door arranged laterally of the seating means, a heating system comprising a source of heated air and a conduit attached to the inside of the door, said conduit cooperating with the source of heated air when the door is in closed position to conduct heated air to the rear compartment.

3. In combination with a vehicle having a front compartment, a rear compartment, seating means separating the two compartments and a door for ingress and egress to and from the front compartment, a heating system comprising a conduit movable with the door, a radiator disposed within one of the compartments, and a blower for blowing air heated by the radiator along the conduit to the other compartment.

4. In combination with a vehicle having a front compartment, a rear compartment, seating means between the front compartment and the rear compartment, and a door arranged laterally of the seating means, a heating system comprising a radiator in the front compartment and a conduit extending rearwardly within the door for conducting heated air from the radiator to the rear compartment when the door is in closed position.

SERGIUS VERNET.